United States Patent
Murai et al.

(10) Patent No.: US 9,446,346 B2
(45) Date of Patent: Sep. 20, 2016

(54) ACIDIC GAS ABSORBING AGENT, METHOD FOR REMOVING ACIDIC GAS AND APPARATUS FOR REMOVING ACIDIC GAS

(71) Applicant: KABUSHIKI KAISHA TOSHIBA, Minato-ku (JP)

(72) Inventors: Shinji Murai, Sagamihara (JP); Yasuhiro Kato, Kawasaki (JP); Takehiko Muramatsu, Yokohama (JP); Satoshi Saito, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/937,209

(22) Filed: Nov. 10, 2015

(65) Prior Publication Data

US 2016/0136568 A1 May 19, 2016

(30) Foreign Application Priority Data

Nov. 14, 2014 (JP) .................. 2014-231957

(51) Int. Cl.
*C07C 215/00* (2006.01)
*B01D 53/14* (2006.01)

(52) U.S. Cl.
CPC ....... *B01D 53/1493* (2013.01); *B01D 53/1425* (2013.01); *B01D 53/1468* (2013.01);
(Continued)

(58) Field of Classification Search
CPC combination set(s) only.
See application file for complete search history.

(56) References Cited

U.S. PATENT DOCUMENTS

| | | |
|---|---|---|
| 2012/0161071 A1 | 6/2012 | Murai et al. |
| 2012/0305840 A1 | 12/2012 | Murai et al. |
| 2015/0044114 A1 | 2/2015 | Murai et al. |

FOREIGN PATENT DOCUMENTS

| | | |
|---|---|---|
| EP | 2 468 385 A2 | 6/2012 |
| EP | 2 468 385 A3 | 6/2012 |
| EP | 2 481 465 A1 | 8/2012 |
| JP | 7-246315 A | 9/1995 |
| JP | 2008-136989 A | 6/2008 |
| JP | 2011-194388 A | 10/2011 |

(Continued)

OTHER PUBLICATIONS

Extended European Search Report issued Mar. 3, 2016 in Patent Application No. 15193912.1.

*Primary Examiner* — Duane Smith
*Assistant Examiner* — Adam W Bergfelder
(74) *Attorney, Agent, or Firm* — Oblon, McClelland, Maier & Neustadt, L.L.P.

(57) ABSTRACT

There is provided an acidic gas absorbing agent that is large in absorption amount and high in absorption rate of an acidic gas per unit volume and can prevent the diffusion of ingredients of the absorbing agent. The acidic gas absorbing agent includes an amino acid salt of formula 1 or formula 2 and an amine compound of formula 3.

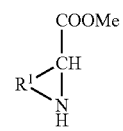

(1)

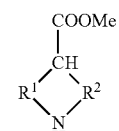

(2)

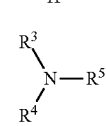

(3)

wherein COOMe represents a carboxylate group; Me represents an alkali metal. $R^1$ and $R^2$ represent an C1-4 alkylene chain; $R^3$ represents a cycloalkyl group; $R^4$ represents a hydrogen atom or an C1-4 alkyl group; and $R^5$ represents a hydroxyalkyl group.

7 Claims, 1 Drawing Sheet

(52) U.S. Cl.
CPC . B01D53/1475 (2013.01); *B01D 2252/20426* (2013.01); *B01D 2252/20431* (2013.01); *B01D 2252/20436* (2013.01); *B01D 2252/20468* (2013.01); *B01D 2252/20484* (2013.01); *B01D 2252/20489* (2013.01); *B01D 2252/20494* (2013.01); *B01D 2252/504* (2013.01); *B01D 2252/602* (2013.01); *B01D 2257/304* (2013.01); *B01D 2257/308* (2013.01); *B01D 2257/504* (2013.01); *B01D 2258/0283* (2013.01); *B01D 2259/124* (2013.01)

(56) References Cited

FOREIGN PATENT DOCUMENTS

| | | |
|---|---|---|
| JP | 2012-143760 A | 8/2012 |
| JP | 2015-29987 A | 2/2015 |

ACIDIC GAS ABSORBING AGENT, METHOD FOR REMOVING ACIDIC GAS AND APPARATUS FOR REMOVING ACIDIC GAS

CROSS REFERENCE TO RELATED APPLICATIONS

This application is based upon and claims the benefit of priority from the prior Japanese Patent Application No. 2014-231957, filed on Nov. 14, 2014, the entire contents of which are incorporated herein by reference.

BACKGROUND OF THE INVENTION

1. Field of Invention

Embodiments of the present invention relate to an acidic gas absorbing agent, a method for removing an acidic gas, and an apparatus for removing an acidic gas.

2. Background Art

A greenhouse effect through an increase in concentration of carbon dioxide ($CO_2$) has recently been pointed out as a cause of a global warning phenomenon, and an urgent task is to implement an international environment protection measure on a global scale. The emission of $CO_2$ is mainly derived from industrial activity, and a momentum towards the suppression of $CO_2$ emission to environment has been increased.

Techniques for the suppression of an increase in the concentration of acidic gases including $CO_2$ include the development of energy saving products, techniques for the utilization of acidic gases as resources and isolation and storage of acidic gases, conversion to alternative energy such as natural energy and nuclear energy that do not emit acidic gases. Techniques for the separation and recovery of acidic gases being emitted are known as one of such techniques.

Acidic gas separation techniques studied up to now include absorption, adsorption, membrane separation, and cryogenic separation methods. Among them, the absorption method is suitable for massive and efficient treatment of gases and is under studies on application to plants and power generation stations.

A method in which exhaust gases that emit in combustion of fossil fuels (for example, coal, petroleum, and natural gas) are brought into contact with a chemical absorbing agent to remove and collect $CO_2$ contained in the combustion exhaust gas, and a method that stores the collected $CO_2$ are known as methods that are mainly intended, for example, for thermal power stations using fossil fuels. Further, a method in which acidic gases such as hydrogen sulfide ($H_2S$) other than $CO_2$ are removed using chemical absorbing agents has been proposed.

In general, alkanolamines exemplified by monoethanolamine (MEA) have been developed as chemical absorbing agents used in the absorbing method since 1930s and have also currently been used. This method is cost-effective and, further, an increase in size of removing apparatuses is easy.

Alkanolamines used in the absorbing method include 2-amino-2-methylpropanolamine, methylaminoethanol, ethylaminoethanol, propylaminoethanol, diethanolamine, methyldiethanolamine, dimethylethanolamine, diethylethanolamine, triethanolamine, and dimethylamino-1-methylethanol.

When these amines are used solely, the $CO_2$ absorption rate is not satisfactory and, thus, in some case, these amines are usually used in combination with compounds having a reaction acceleration effect. Cyclodiamines are known as compounds having a reaction acceleration effect but suffer from a problem of a high tendency towards diffusion due to high vapor pressure. The use of amino acid salts sometimes improve the diffusibility. As long as the present inventor knows, $CO_2$ absorbing properties are not satisfactory.

Thus, the development of novel reaction accelerators that have excellent $CO_2$ absorbing properties and improved diffusibility has been demanded.

SUMMARY OF THE INVENTION

Problems to be Solved by the Invention

An object of the present invention is to provide an acidic acid absorbing agent that is large in the amount of acidic gas absorbed and low in diffusibility, and an acidic gas removing method and an acidic gas removing apparatus using the same.

Means for Solving the Problems

According to an aspect of the present invention, there is provided an acidic gas absorbing agent comprising:

an amino acid salt represented by general formula (1) or (2):

wherein COOMe represents a carboxylate group; Me represents an alkali metal; and $R^1$ and $R^2$ each independently represent an alkylene chain having 1 to 4 carbon atoms and a carboxylate group and/or an alkyl group having 1 to 4 carbon atoms may be bonded to any of the carbon atoms in the alkylene chain, provided that the total number of carbon atoms in the alkylene chains indicated by $R^1$ and $R^2$ is 1 to 5; and an amine compound represented by general formula (3):

wherein $R^3$ represents a substituted or unsubstituted cycloalkyl group having 3 to 8 carbon atoms; $R^4$ represents a hydrogen atom or an alkyl group having 1 to 4 carbon atoms; and $R^5$ represents a hydroxyalkyl group.

According to another aspect of the present invention, there is provided a method for removing an acidic gas, the method comprising bringing a gas containing an acidic gas into contact with the above acidic gas absorbing agent to remove the acidic gas from the gas containing the acidic gas.

According to a further aspect of the present invention, there is provided an acidic gas removing apparatus comprising:

an absorber that brings a gas containing an acidic gas into contact with an acidic gas absorbing agent to absorb the acidic gas in the acidic gas absorbing agent, thereby removing the acidic gas from the gas containing the acidic gas; and a regenerator that desorbs the acidic gas from the acidic gas absorbing agent with the acidic gas absorbed therein to regenerate the acidic gas absorbing agent, the acidic gas absorbing agent regenerated in the regenerator being reutilized in the absorber, wherein an acidic gas absorbing agent according to the above aspect of the present invention is used as the acidic gas absorbing agent.

MODE FOR CARRYING OUT THE INVENTION

Embodiments of the present invention will be described in more detail.

The acidic gas absorbing agent according to one aspect of the present invention includes an amino acid salt represented by general formula (1) or (2):

wherein COOMe represents a carboxylate group; Me represents an alkali metal; and $R^1$ and $R^2$ each independently represent an alkylene chain having 1 to 4 carbon atoms and a carboxylate group and/or an alkyl group having 1 to 4 carbon atoms may be bonded to any of the carbon atoms in the alkylene chain, provided that the total number of carbon atoms in the alkylene chains indicated by $R^1$ and $R^2$ is 1 to 5; and an amine compound represented by general formula (3):

wherein $R^3$ represents a substituted or unsubstituted cycloalkyl group having 3 to 8 carbon atoms; $R^4$ represents a hydrogen atom or an alkyl group having 1 to 4 carbon atoms; and $R^5$ represents a hydroxyalkyl group.

In the acidic gas absorbing agent according to one aspect of the present invention, the amino acid salt represented by general formula (1) or (2) and the amine compound represented by general formula (3) are mixed, for example, with a solvent such as water and, if necessary, assistants such as an antioxidant and a pH adjustor, before utilization as the acidic gas absorbing agent for an acidic gas absorbing method and an acidic gas absorbing apparatus.

Further, a lower heat of reaction is obtained, and the carbon dioxide absorption can be increased.

Specifically, in the amine compound of general formula (3), the cycloalkyl group ($R^3$), the hydrogen atom or the alkyl group ($R^4$), and the hydroxyalkyl group ($R^5$) are bonded to the nitrogen atom.

Thus, the amine compound of general formula (2) in which the cyclic alkyl group is directly bonded to the nitrogen atom has a structure having a high level of steric hindrance and, thus, is reacted with carbon dioxide ($CO_2$) to produce bicarbonate ions, leading to a lowered heat of reaction.

<Amino Acid Salt>

It has hitherto been known that the amino acid salt is used as an absorbing solution. However, a further improvement in an acidic gas absorption amount and diffusibility is demanded.

The present inventors have found that amino acid salts having a specific cyclic structure act as a reaction accelerator for an absorbing solution composed mainly of an amino alcohol.

The specific amino acid salt of general formula (1) or (2) has a vapor pressure that is small enough to be negligible as compared with cyclodiamines such as piperazine. Accordingly, when the specific amino acid salt is utilized as an acidic gas absorbing agent in the acidic gas absorption method and the acidic gas absorbing apparatus, the diffusion of the absorbing agent into the outside of the reactor can be suppressed.

The amino acid salt of general formula (1) or (2) has a structure different from conventional chain amino acid salts and is highly reactive with acidic gases (for example, carbon dioxide ($CO_2$), hydrogen sulfide ($H_2S$), or carbonyl sulfide (COS)) and highly soluble in water and, thus, is less likely to precipitate when it absorbs acidic gases.

The acidic gas absorbing agent in an embodiment of the present invention has a high acidic gas absorption and, at the same time, is less likely to precipitate when it absorbs acidic gases. Further, since the diffusibility of the amine as the ingredient of the absorbing agent is suppressed, the amount of the amine diffused into the air can be significantly reduced. In particular, cyclo-α-amino acid salts of general formula (1) (that is, compounds having a structure including a carbocylic acid salt and an amino group bonded directly to an identical carbon) have a particularly high dissolvability and thus are less likely to precipitate when they absorb acidic gases.

In the following embodiment, the acid gas absorbing agent will be described by taking, as an example, carbon dioxide as the acidic gas. However, it should be noted that the acidic gas absorbing agent in the embodiment of the present invention has the same effect for other acidic gases such as hydrogen sulfide. The acidic gas absorbing agent in the embodiment is particularly suitable for the absorption of oxidizing gases such as carbon dioxide and hydrogen sulfide.

In amino acid salts of general formula (1) or general formula (2), $R^1$ and $R^2$ each represent a methylene, ethylene, propylene, or butylene group. In these groups, a part of hydrogen atoms may be substituted by an alkyl group having 1 to 3 carbon atoms or a carboxylate group (preferably, an alkali metal salt, especially a sodium salt). Among them, methylene, ethylene, and propylene groups substituted by one or at least two carboxylic acid sodium salts are particularly preferred. Thus, when $R^1$ and (or) $R^2$ are substituted by a carboxylic acid sodium salt, the amino acid salt of general formula (1) or (2) contain two or at least three sodium carboxylate. Such compounds have better dissolvability and, thus, are more less likely to precipitate when they absorb acidic gases. Accordingly, the amino acid salt of general formula (1) or (2) contains at least one sodium carboxylate. preferably two or three carboxylate groups.

Compounds in which the total number of carbon atoms in $R^1$ and $R^2$ is 4 or less are more preferred than compounds in which the total number of carbon atoms in $R^1$ and $R^2$ is 5 or more from the viewpoint of a reaction acceleration effect.

From the viewpoint of dissolvability, compounds of general formula (1) are preferred. Among them, compounds in which the number of carbon atoms in $R^1$ is 1 to 5 are preferred, and compounds in which the number of carbon atoms in $R^1$ is three are particularly preferred, Me represents an alkali metal. Me may be any desired alkali metal selected from lithium, sodium, potassium, rubidium, and cesium. In the embodiment of the present invention, sodium and potassium are particularly preferred because the molecular weight of the amino acid salt is not excessively large.

In the embodiment of the present invention, amino acid salts of general formula (1) that are different in Me, $R^1$ and (or) $R^2$ and amino acid salts of general formula (2) that are different in $R^1$ and (or) $R^2$ may be used in combination.

In the embodiment of the present invention, specific examples of amino acid salts include the following compounds:
ethyleneimine-2-carboxylic acid sodium salt,
ethyleneimine-2,3-dicarboxylic acid sodium salt,
azetidine-2-carboxylic acid sodium salt,
azetidine-3-carboxylic acid sodium salt,
azetidine-2,3-dicarboxylic acid sodium salt,
azetidine-2,3,4-tricarboxylic acid sodium salt,
pyrrolidine2-carboxylic acid sodium salt,
pyrrolidine3-carboxylic acid sodium salt,
pyrrolidine2,3-dicarboxylic acid sodium salt,
pyrrolidine2,4-dicarboxylic acid sodium salt,
pyrrolidine3,4-dicarboxylic acid sodium salt,
pyrrolidine2,3,4-tricarboxylic acid sodium salt,
pyrrolidine2,3,5-tricarboxylic acid sodium salt,
pyrrolidine2,3,4,5-tetracarboxylic acid sodium salt,
piperidine-2-carboxylic acid sodium salt,
piperidine-3-carboxylic acid sodium salt,
piperidine-4-carboxylic acid sodium salt,
piperidine-2,3-dicarboxylic acid sodium salt,
piperidine-2,4-dicarboxylic acid sodium salt,
piperidine-2,5-dicarboxylic acid sodium salt,
piperidine-2,6-dicarboxylic acid sodium salt,
piperidine-3,4-dicarboxylic acid sodium salt,
piperidine-3,5-dicarboxylic acid sodium salt, and
potassium salts thereof.

Among them, pyrrolidine derivatives and piperidine derivatives are preferred from the viewpoints of improving carbon dioxide absorption amount and absorption rate of the acidic gas absorbing agent. The acidic gas absorbing agent in the embodiment of the present invention contains at least one of the amino acid salts of general formula (1) or (2).

The amount of the amino acid salt of general formula (1) or (2) (when a plurality of amino acid salts satisfying general formula (1) or (2) are used in combination, the amount is the total amount of the plurality of compounds) is preferably 0.1 to 20% by mass, particularly preferably 5 to 15% by mass)

(on the assumption that the whole amount of the acidic gas absorbing agent is 100% by mass). When the content of the amino acid salt of general formula (1) or (2) contained in the acidic gas absorbing agent is less than 0.1% by mass, there is a possibility that the effect of improving the acidic gas absorption rate cannot be satisfactorily obtained. When the content of the specific amino acid is more than 20% by mass, the viscosity of the absorbing agent is excessively high and, consequently, the reactivity is likely to be lowered.

Thus, acidic gas absorbing agents in the embodiment of the present invention that contain amino acid salt compounds of general formula (1) or (2) and amine compounds of general formula (3) (that will be described later) have further improved absorption amount of acidic gas (particularly carbon dioxide) per mole and acidic gas absorption amount and acidic gas absorption rate of the acidic gas absorbing agent per unit volume. Further, since acidic gas separating energy (acidic gas desorption energy) is lowered, energy necessary for the regeneration of the acidic gas absorbing agent can be reduced.

<Amine Compound>

The acidic gas absorbing agent in the embodiment of the present invention contains an amine compound of general formula (3) as one indispensable ingredient:

(3)

In general formula (3), $R^3$ represents a substituted or unsubstituted cycloalkyl group having 3 to 8 carbon atoms. Examples of substituted or unsubstituted cycloalkyl groups having 3 to 8 carbon atoms include cyclopropyl, cyclobutyl, cyclopentyl, cyclohexyl, cycloheptyl, and cyclooctyl groups. These cycloalkyl groups may contain a hetero atom such as Si, O, N, or S in the ring. The alkyl group in the substituted or unsubstituted cycloalkyl group having 3 to 8 carbon atoms is more preferably a cyclopentyl or cyclohexyl group.

In the acidic gas absorbing agent, since $R^3$ mainly has a cyclic structure, the volatility of the amine compound of general formula (3) is suppressed and, consequently, the amount of the amine ingredient released into the air in the process of acidic gas treatment is smaller than that of general chain alkanolamine. Further, since $R^3$ mainly has a cyclic structure, the heat of reaction in the reaction of the amine compound of general formula (3) with the acidic gas is reduced.

$R^4$ represents a hydrogen atom or an alkyl group having 1 to 4 carbon atoms (specifically a methyl, ethyl, propyl, or butyl group).

$R^5$ represents a hydroxyalkyl group. Hydroxyalkyl groups having 2 to 4 carbon atoms are preferred from the viewpoint of improving the reactivity with carbon dioxide. A 2-hydroxyethyl group is more preferred.

In amine compounds of general formula (3), a cycloalkyl group ($R^3$), a hydrogen atom or an alkyl group ($R^4$), and a hydroxyalkyl group ($R^5$) are bonded to a nitrogen atom.

The amine compound with the cycloalkyl group bonded directly to the nitrogen atom has a high level of steric hindrance, and, thus, in the reaction of the amine compound with carbon dioxide ($CO_2$), bicarbonate ions having a low heat of reaction are produced. Therefore, the amount of heat generated in the reaction with the acidic gas is small, and the amount of the acidic gas absorbed is large. The amine compound with the cycloalkyl group bonded directly to the nitrogen atom has a very low volatility, and, consequently, the amount of leakage of the amine compound into the outside of the apparatus is very small.

Specific examples of preferred amine compounds of general formula (3) include:
2-(cyclopropylamino)ethanol,
3-(cyclopropylamino)-1-propanol,
1-(cyclopropylamino)-2-propanol,
4-(cyclopropylamino)-1-butanol,
4-(cyclopropylamino)-2-butanol,
2-(cyclobutylamino)ethanol,
3-(cyclobutylamino)-1-propanol,
1-(cyclobutylamino)-2-propanol,
4-(cyclobutylamino)-1-butanol,
4-(cyclobutylamino)-2-butanol,
2-(cyclopentylamino)ethanol,
3-(cyclopentylamino)-1-propanol,
1-(cyclopentylamino)-2-propanol,
4-(cyclopentylamino)-1-butanol,
4-(cyclopentylamino)-2-butanol,
2-(cyclohexylamino)ethanol,
3-(cyclohexylamino)-1-propanol,
1-(cyclohexylamino)-2-propanol,
4-(cyclohexylamino)-1-butanol,
4-(cyclohexylamino)-2-butanol,
2-(cycloheptylamino)ethanol,
3-(cycloheptylamino)-1-propanol,
1-(cycloheptylamino)-2-propanol,
4-(cycloheptylamino)-1-butanol,
4-(cycloheptylamino)-2-butanol,
2-(cyclooctylamino)ethanol,
1-(cyclooctylamino)-2-propanol,
4-(cyclooctylamino)-1-butanol,
4-(cyclooctylamino)-2-butanol,
2-(N-cyclopropyl-N-methylamino)ethanol,
3-(N-cyclopropyl-N-methylamino)-1-propanol,
1-(N-cyclopropyl-N-methylamino)-2-propanol,
4-(N-cyclopropyl-N-methylamino)-1-butanol,
4-(N-cyclopropyl-N-methylamino)-2-butanol,
2-(N-cyclobutyl-N-methylamino)ethanol,
3-(N-cyclobutyl-N-methylamino)-1-propanol,
1-(N-cyclobutyl-N-methylamino)-2-propanol,
4-(N-cyclobutyl-N-methylamino)-1-butanol,
4-(N-cyclobutyl-N-methylamino)-2-butanol,
2-(N-cyclopentyl-N-methylamino)ethanol,
2-(N-cyclopentyl-N-ethylamino)ethanol,
3-(N-cyclopentyl-N-methylamino)-1-propanol,
1-(N-cyclopentyl-N-methylamino)-2-propanol,
4-(N-cyclopentyl-N-methylamino)-1-butanol,
4-(N-cyclopentyl-N-methylamino)-2-butanol,
2-(N-cyclohexyl-N-methylamino)ethanol,
2-(N-cyclohexyl-N-ethylamino)ethanol,
3-(N-cyclohexyl-N-methylamino)-1-propanol,
1-(N-cyclohexyl-N-methylamino)-2-propanol,
4-(N-cyclohexyl-N-methylamino)-1-butanol,
4-(N-cyclohexyl-N-methylamino)-2-butanol,
2-(N-cycloheptyl-N-methylamino)ethanol,
3-(N-cycloheptyl-N-methylamino)-1-propanol,
1-(N-cycloheptyl-N-methylamino)-2-propanol,
4-(N-cycloheptyl-N-methylamino)-1-butanol,
4-(N-cycloheptyl-N-methylamino)-2-butanol,
2-(N-cyclooctyl-N-methylamino)ethanol,
1-(N-cyclooctyl-N-methylamino)-2-propanol,
4-(N-cyclooctyl-N-methylamino)-1-butanol, and
4-(N-cyclooctyl-N-methylamino)-2-butanol.

The content of the amine compound of general formula (3) contained in the acidic gas absorbing agent is preferably 10 to 60% by mass, particularly preferably 20 to 50% (on the assumption that the whole amount of the acidic gas absorbing agent is 100% by mass). In general, the higher the concentration of the amine ingredient, the larger the amount of acidic gas absorbed and the amount of acidic gas desorbed per unit volume and the higher the absorption rate and desorption rate of carbon dioxide. This is advantageous in terms of efficient recovery of carbon dioxide and is preferred in terms of energy consumption and size of plant facilities, and treatment efficiency. When the concentration of the amine ingredient in the absorbing solution is excessively high, water contained in the absorbing solution cannot satisfactorily function as an activating agent for the acidic gas absorption. Further, when the concentration of the amine ingredient in the absorbing solution is excessively high, a non-negligible phenomenon such as increased viscosity of the absorbing solution occurs.

When the content of the amine compound of general formula (3) is not more than 60% by mass, the phenomenon such as increased viscosity of the absorbing solution is not observed. When the content of the specific amine compound is not less than 10% by mass, the absorption amount and absorption rate of carbon dioxide are satisfactory resulting in a high treatment efficiency.

<Other Ingredients (Optional Ingredients and the Like)>

The acidic gas absorbing agent in an embodiment of the present invention contains an amino acid salt compound of general formula (1) or (2) and an amine of general formula (3). The acidic absorbing agent, when mixed, for example, with a solvent such as water and, if necessary, various auxiliary materials is suitable, for example, as the acidic gas absorbing agent for acidic gas absorption methods or acidic gas absorbing apparatuses. Here specific examples of auxiliary materials include antioxidants, pH adjustors, antifoaming agents, and anticorrosives.

When water is used as a solvent, the content of water is preferably 20 to 60% by mass, particularly preferably 30 to 60% by mass (on the assumption that the whole amount of the acidic gas absorbing agent is 100% by mass). A water content in the above-defined range is preferred from the viewpoints of suppressing an increase in the viscosity of the absorbing solution and suppressing foaming in the absorption of carbon dioxide.

Specific examples of preferred antioxidants include dibutylhydroxytoluene (BHT), butylhydroxyanisole (BHA), sodium erythorbate, sodium nitrite, sulfur dioxide, 2-mercaptoimidazole, and 2-mercaptobenzimdazole. When an antioxidant is used, the content of the antioxidant is preferably 0.01 to 1% by mass, particularly preferably 0.1 to 0.5% by mass (on the assumption that the whole amount of the acidic gas absorbing agent is 100% by mass). The antioxidant can realize the prevention of a deterioration and an improvement in fastness of the acidic gas absorbing agent.

Specific examples of preferred antifoaming agents include silicone-based antifoaming agents and organic antifoaming agents. When the antifoaming agent is used, the content of the antifoaming agent is preferably 0.00001 to 0.001% by mass, particularly preferably 0.0005 to 0.001% by mass (on the assumption that the whole amount of the acidic gas absorbing agent is 100% by mass). The antifoaming agent can prevent foaming of the acidic gas absorbing agent, suppress a lowering in absorption efficiency and desorption efficiency of the acidic gas, and prevent a lowering in fluidity and circulation efficiency.

Specific examples of preferred anticorrosives include phosphoric acid esters, tolytriazoles, and bezotriazoles. When the anticorrosive is used, the content of the anticorrosive is preferably 0.00003 to 0.0008% by mass, particularly preferably 0.00005 to 0.005% by mass (on the assumption that the whole amount of the acidic gas absorbing agent is 100% by mass). The anticorrosive can prevent the corrosion of plant facilities and improve fastness.

In the acidic gas absorbing agent in an embodiment of the present invention, the acidic gas absorbing agent may be used as an optional proper mixture with an aminoalcohol. The sue of the aminoalcohol can contribute to a modification or improvement, for example, in absorption amount, release amount, and absorption rate.

Examples of suitable aminoalcohols include: monoethanolamine,
2-amino-2-methylpropanolamine,
2-amino-2-methyl-1, 3-dipropanolamine,
methylaminoethanol,
ethylaminoethanol,
propylaminoethanol,
diethanolamine,
bis(2-hydroxy-1-methylethyl)amine,
methyldiethanolamine,
dimethylethanolamine,
diethylethanolamine,
triethanolamine,
dimethylamino-1-methylethanol,
2-methylaminoethanol,
2-ethylaminoethanol,
2-propylaminoethanol,
n-butylaminoethanol,
2-(isopropylamino)ethanol,
3-ethylaminopropanol,
triethanolamine, and
diethanolamine.

Among them, at least one compound selected from 2-(isopropylamino)ethanol and 2-amino-2-methyl-1-propanol is preferred as the alkanolamines from the viewpoint of further improving the reactivity of the amine compound of general formula (3) with the acidic gas.

When these aminoalcohols are used, the amount of the aminoalcohols used is preferably 1 to 30% by volume based on 100% by volume of the amine compound of general formula (3).

<Method for Removing Acidic Acid>

The method for removing an acidic gas in an embodiment of the present invention includes bringing a gas containing an acidic gas into contact with an acidic gas absorbing agent in the above embodiment to remove the acidic gas from the gas containing the acidic gas.

The method for removing an acidic gas in an embodiment of the present invention basically includes the steps of: absorbing an acidic gas in the acidic gas absorbing agent in the above embodiment of the present invention (an absorption step); and desorbing the acidic gas from the acidic gas absorbing agent in the above embodiment of the present invention that has absorbed the acidic gas.

The method for removing an acidic gas in an embodiment of the present invention basically includes the steps of: bringing a gas containing an acidic gas (for example, an exhaust gas) into contact with an acidic agent absorbing agent to absorb the acidic gas in the acidic gas absorbing agent (an acidic gas absorption step) and heating the acidic gas absorbing agent with the acidic gas absorbed therein obtained in the acidic gas absorption step to desorb and remove the acidic gas (an acidic gas separation step).

The gas containing the acidic gas can be brought into contact with an aqueous solution containing the acidic gas absorbing agent by any method without particular limitation, and examples of methods for bringing the gas into contact with the aqueous solution include a method in which the gas containing the acidic gas is introduced into the acidic gas absorbing agent by bubbling to absorb the acidic gas into the absorbing agent, a method in which the acidic gas absorbing agent is allowed to fall like mist into a gas stream containing an acidic gas (a misting or spraying method), or a method in which a gas containing an acidic gas is brought into a countercurrent contact with an acidic gas absorbing agent in an absorption vessel containing a porcelain or metallic mesh filler.

The temperature of the acidic gas absorbing agent in the absorption of the gas containing the acidic gas in the aqueous solution is generally room temperature to 60° C., preferably 50° C. or below, more preferably about 20 to 45° C. The lower the temperature of the acidic gas absorbing agent, the larger the amount of the acidic gas absorbed. However, the lower limit of the treatment temperature may be determined, for example, by a gas temperature on the process and a heat recovery target. The pressure in the acidic gas absorption is generally a substantially atmospheric pressure. The application of pressure to a higher value for absorbing capability enhancement purposes is possible. However, the treatment under an atmospheric pressure is preferred from the viewpoint of reducing energy consumption necessary for compression.

Methods for separating the acidic gas from the acidic gas absorbing agent with the acidic gas absorbed therein to recover pure or high-concentration carbon dioxide include a method in which, as in distillation, the acidic gas absorbing agent is heated and foamed in a kettle for desorption of the carbon dioxide, and a method in which a liquid interface is widened and heated in a plate column, a spray tower, or a regeneration tower containing a porcelain or metallic net filler. According to this method, the acidic gas is liberated and released from carbamate anions or bicarbonate ions.

The temperature of the acidic gas absorbing agent in the separation of the acidic gas may be generally 70° C. or above, preferably 80° C. or above, more preferably 90 to 120° C. The higher the temperature, the larger the amount of the acidic gas desorbed. Increasing the temperature, however, leads to an increase in energy necessary for heating of the absorbing solution. Accordingly, the temperature may be determined, for example, by gas temperature on the process and heat recovery target. The pressure in the desorption of the acidic gas is generally carried out under an atmospheric pressure. Evacuation to a lower pressure is possible for desorption capability enhancement purposes. From the viewpoint of reducing energy consumption necessary for evacuation, however, the separation under an atmospheric pressure is preferred.

The acidic gas absorbing agent after the separation of the acidic gas may be again supplied to the acidic gas absorption step for recirculation (recycling). Heat generated in the acidic gas absorption is generally heat-exchanged in a heat exchanger to preheat an aqueous solution introduced into the regenerator in a process of recycling of the aqueous solution, whereby the heat is cooled.

The purity of the acidic gas thus recovered is generally very high and about 95 to 99% by volume. The pure acidic gas or high-concentration acidic gas may be used, for example, as chemicals, starting materials for the synthesis of polymeric substances, and cooling agents for food freezing.

Further, the recovered acidic gas may also be isolated and stored, for example, in the ground currently under technical development.

Among the above steps, the step of separating the acidic gas from the acidic gas absorbing agent and regenerating the acidic gas absorbing agent is a step that consumes the largest amount of energy, and about 50 to 80% of the total energy in the whole process is consumed in this step. Accordingly, reducing the consumption energy in the step of regenerating the acidic gas absorbing agent can contribute to a reduction in cost of the step of absorbing and separating the acidic gas, and, thus, the removal of the acidic gas from the exhaust gas can be advantageously carried out in a cost-effective manner.

In this embodiment, the use of the acidic gas absorbing agent in the above embodiment contributes to a reduction in energy necessary for the desorption of the acidic gas (regeneration step). Accordingly, the step of absorbing and separating carbon dioxide can be carried out under advantageous cost-effective conditions.

As compared with alkanolamines such as 2-aminoethanol that have hitherto been used as acidic gas absorbing agents, the amine compound in the above embodiment is much less likely to attack metallic materials such as carbon steels. Accordingly, when this acidic gas absorbing agent is used in the acidic gas removing method, for example, in the construction of plants, there is no need to use high-cost high-grade corrosion-resistant steels. This is advantageous in cost.

<Acidic Gas Removing Apparatus>

The acidic gas removing apparatus in an embodiment of the present invention includes: an absorber that brings a gas containing an acidic gas into contact with an acidic gas absorbing agent to absorb the acidic gas in the acidic gas absorbing agent, thereby removing the acidic gas from the gas containing the acidic gas; and a regenerator that desorbs the acidic gas from the acidic gas absorbing agent with the acidic gas absorbed therein, the acidic gas absorbing agent regenerated in the regenerator being reutilized in the absorber, wherein an acidic gas absorbing agent in the above specific embodiment of the present invention is used as the acidic gas absorbing agent.

Figure 1:
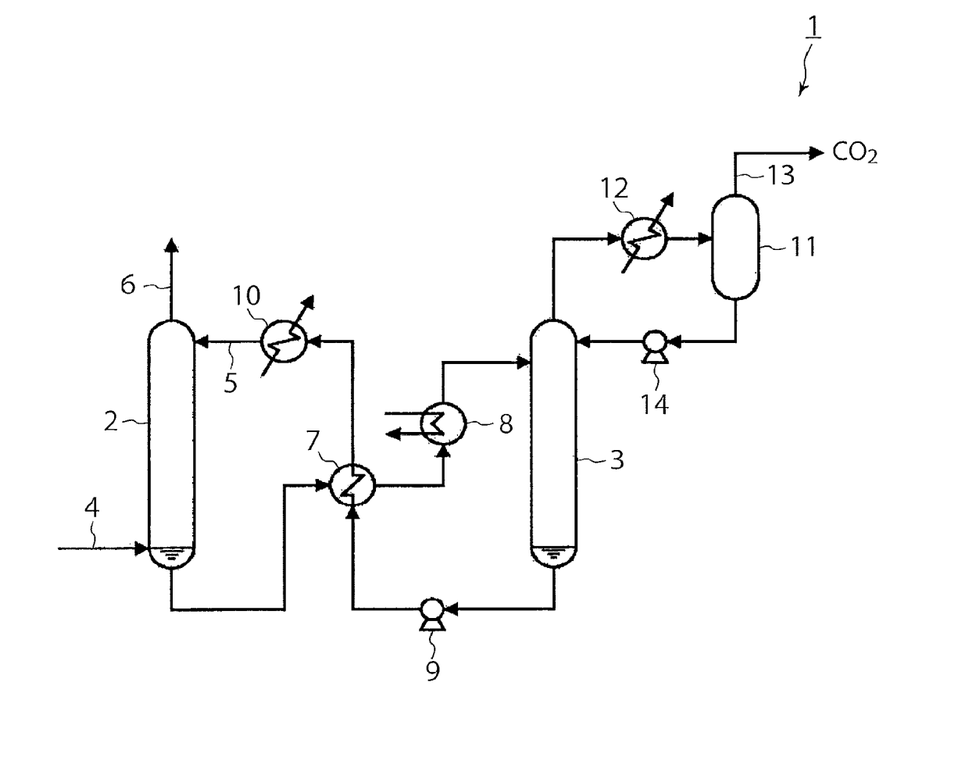
FIG. 1 is a schematic view of an acidic gas removing apparatus in an embodiment.

FIG. 1 is a schematic view of an acidic gas removing apparatus in an embodiment of the present invention.

This acidic gas removing apparatus 1 includes an absorber 2 that brings a gas containing an acidic gas (for example, an exhaust gas) into contact with an acidic gas absorbing agent to absorb the acidic gas in the acidic gas absorbing agent, thereby removing the acidic gas from the gas containing the acidic gas; and a regenerator 3 that desorbs the acidic gas from the acidic gas absorbing agent with the acidic gas absorbed therein to regenerate the acidic gas absorbing agent. The acid gas removing apparatus will be described by taking, as an example, carbon dioxide as the acidic gas.

As illustrated in FIG. 1, an exhaust gas containing carbon dioxide such as combustion exhaust gas discharged, for example, from thermal electric power plants is passed through a gas supply port 4 and guided to the bottom of the absorber 2. This exhaust gas is forced into the absorber 2 and brought into contact with an acidic gas absorbing agent supplied from an acidic gas absorbing agent supply port 5 provided at an upper part of the absorber 2. An acidic gas absorbing agent in the above embodiment is used as the acidic gas absorbing agent.

The pH value of the acidic gas absorbing agent may be adjusted to at least 9 but may be properly adjusted to an optimal value depending, for example, upon type, concentration, and flow rate of harmful gases contained in the exhaust gas.

The acidic gas absorbing agent may contain, in addition to the above amine-based compounds and solvents such as water and other compounds such as nitrogen-containing compounds that improve a carbon dioxide absorbing capability, antioxidants, and pH adjustors at any desired ratio.

Thus, when the exhaust gas comes into contact with the acidic gas absorbing agent, carbon dioxide in the exhaust gas is absorbed in the acidic gas absorbing agent and removed from the exhaust gas. The exhaust gas after the removal of carbon dioxide is discharged through a gas discharge port 6 into the outside of the absorber 2.

The solution of the acidic gas absorbing agent with carbon dioxide absorbed therein is supplied to the heat exchanger 7 and a heater 8 for heating. The heated solution is then supplied to the regenerator 3. The solution of the acidic gas absorbing agent supplied into the regenerator 3 is moved from the upper part to the lower part of the regenerator 3. During the movement, the acidic gas in the acidic gas absorbing agent is desorbed to regenerate the acidic gas absorbing agent.

The solution of the acidic gas absorbing agent regenerated in the regenerator 3 is supplied through a pump 9 to the heat exchanger 7 and an absorbing solution cooler 10 and is returned to the absorber 2 through the acidic gas absorbing agent supply port 5.

On the other hand, the acidic gas separated from the acidic gas absorbing agent comes into contact with refluxed water supplied from a refluxing drum 11 at an upper part of the regenerator 3 and is discharged into the outside of the regenerator 3.

The refluxed water with carbon dioxide dissolved therein is cooled in a reflux condenser 12 and, in the refluxing drum 11, is separated from a liquid component produced as a result of condensation of water vapor containing carbon dioxide. The liquid component is led to an acidic gas recovery step through a recovered acidic gas line 13. On the other hand, the refluxed water with the acidic gas separated therefrom is supplied to the regenerator 3 through a refluxed water pump 14.

The acid gas removing apparatus 1 in this embodiment can realize the absorption and removal of acidic gas with a high efficiency through the utilization of an acidic gas absorbing agent having excellent acidic gas absorbing properties and desorbing properties.

EXAMPLES

Embodiments of the present invention will be described in more detail with reference to the following Examples and Comparative Examples.

Example 1

2-(Cyclopentylamino)ethanol and pyrrolidine-2-carboxylic acid sodium salt were dissolved in water to 45% by mass and 5% by mass, respectively, to prepare 50 ml of an aqueous solution (hereinafter referred to as "absorbing solution"). This absorbing solution was filled into a testing tube and was heated to 40° C. A mixed gas containing 10% by volume of carbon dioxide ($CO_2$) and 90% by volume of nitrogen ($N_2$) gas was blown at a flow rate of 400 mL/min into the testing tube, and the concentration of carbon dioxide ($CO_2$) in gas at the outlet of the testing tube was measured with an infrared gas concentration measuring apparatus (tradename "CGT-700," manufactured by Shimadzu Seisakusho Ltd.) to evaluate an absorbing capability.

A rate of absorption at a time of 2 min after the start of the absorption of carbon dioxide was regarded as the rate of absorption of carbon dioxide in the absorbing solution.

The heat of reaction was measured as follows. The heat of reaction in the absorption of carbon dioxide in an absorbing solution was measured with a differential thermal reaction calorimeter "DRC Evolution" (tradename, manufactured by SETARAM) including a glass reaction tank and a reference tank that were installed in a thermostatic chamber and had an identical shape.

The absorbing solution (140 mL) was filled into each of the reaction tank and the reference tank, and a constant temperature water of 40° C. was circulated through a jacket in the tank. In this state, a carbon dioxide gas having a concentration of 100% was blown at a rate of 200 ml/min into the absorbing solution in the reaction tank, and a rise in temperature of the solution was continuously recorded with a temperature recorder until the absorption of carbon dioxide was completed. The heat of reaction was then calculated using a previously measured overall heat transfer coefficient between the reaction tank and water in the jacket.

The diffusibility of a reaction accelerator was evaluated as follows. Specifically, the absorbing solution was introduced into a flask with a cooling tube, and the flask was then heated in an oil bath for reflux of the absorbing solution. During this period, nitrogen gas was blown at a rate of 100 ml/min into the absorbing solution. The test was stopped when the amount of the liquid recovered after cooling in the cooling tube reached 100 ml, and the amount of the reaction accelerator contained in 100 ml of the recovered liquid was measured (diffusibility test).

The amount of carbon dioxide absorbed in the absorbing solution at 40° C. was 0.56 mol per mol of the amine compound in the absorbing solution. The rate of absorption of carbon dioxide was 0.00 47 mol/mol/min.

Example 2

An absorbing solution was prepared in the same manner as in Example 1, except that piperidine-2-carboxylic acid sodium salt was used instead of the pyrrolidine-2-carboxylic acid sodium salt. For the absorbing solution, the amount of carbon dioxide absorbed, the rate of absorption of carbon dioxide, the heat of reaction, and the amount of amine compound collected were measured with the same apparatus as used in Example 1 under the same conditions as used in Example 1.

The amount of carbon dioxide absorbed at 40° C. was 0.55 mol per mol of the amine compound in the absorbing solution. The rate of absorption of carbon dioxide was 0.0046 mol/mol/min.

Example 3

An absorbing solution was prepared in the same manner as in Example 1, except that 4-piperidinecarboxylic acid sodium salt was used instead of the pyrrolidine-2-carboxylic acid sodium salt. For the absorbing solution, the amount of carbon dioxide absorbed, the rate of absorption of carbon dioxide, the heat of reaction, and the amount of amine compound collected were measured with the same apparatus as used in Example 1 under the same conditions as used in Example 1.

The amount of carbon dioxide absorbed at 40° C. was 0.54 mol per mol of the amine compound in the absorbing solution. The rate of absorption of carbon dioxide was 0.0044 mol/mol/min.

Example 4

Measurement was carried out in the same manner as in Example 1, except that N-(cyclopentylamino)-N-methylaminoethanol was used instead of 2-(cyclopentylamino)ethanol.

The amount of carbon dioxide absorbed at 40° C. was 0.42 mol per mol of the amine compound in the absorbing solution. The rate of absorption of carbon dioxide was 0.0040 mol/mol/min.

Example 5

Measurement was carried out in the same manner as in Example 4, except that piperidine-2-carboxylic acid sodium salt was used instead of pyrrolidine-2-carboxylic acid sodium salt.

The amount of carbon dioxide absorbed at 40° C. was 0.41 mol per mol of the amine compound in the absorbing solution. The rate of absorption of carbon dioxide was 0.0038 mol/mol/min.

Example 6

An absorbing solution was prepared in the same manner as in Example 1, except that 2-(cyclohexylamino)ethanol was used instead of 2-(cyclopentylamino)ethanol. For the absorbing solution, the amount of carbon dioxide absorbed, the rate of absorption of carbon dioxide, the heat of reaction, and the amount of amine compound recovered were measured with the same apparatus as used in Example 1 under the same conditions as used in Example 1.

The amount of carbon dioxide absorbed at 40° C. was 0.50 mol per mol of the amine compound in the absorbing solution. The rate of absorption of carbon dioxide was 0.0040 mol/mol/min.

Example 7

An absorbing solution was prepared in the same manner as in Example 1, except that 3-(cyclopentylamino)propanol was used instead of 2-(cyclopentylamino)ethanol. For the absorbing solution, the amount of carbon dioxide absorbed, the rate of absorption of carbon dioxide, the heat of reaction, and the amount of amine compound recovered were measured with the same apparatus as used in Example 1 under the same conditions as used in Example 1.

The amount of carbon dioxide absorbed at 40° C. was 0.48 mol per mol of the amine compound in the absorbing solution. The rate of absorption of carbon dioxide was 0.0041 mol/mol/min.

Example 8

An absorbing solution was prepared in the same manner as in Example 1, except that 2-(cyclobutylamino)propanol was used instead of 2-(cyclopentylamino)ethanol. For the absorbing solution, the amount of carbon dioxide absorbed, the rate of absorption of carbon dioxide, the heat of reaction, and the amount of amine compound collected were measured with the same apparatus as used in Example 1 under the same conditions as used in Example 1.

The amount of carbon dioxide absorbed at 40° C. was 0.51 mol per mol of the amine compound in the absorbing solution. The rate of absorption of carbon dioxide was 0.0044 mol/mol/min.

Comparative Example 1

2-Butylethanolamine and piperazine were dissolved in water to 45% by mass and 5% by mass, respectively, to prepare 50 ml of an aqueous solution (hereinafter referred to as "absorbing solution"). Thereafter, the amount of carbon dioxide absorbed, the rate of absorption of carbon dioxide, the heat of reaction, and the amount of amine compound recovered were measured with the same apparatus as used in Example 1 under the same conditions as used in Example 1.

The amount of carbon dioxide absorbed at 40° C. was 0.35 mol per mol of the amine compound in the absorbing solution. The rate of absorption of carbon dioxide was 0.0043 mol/mol/min.

Comparative Example 2

Measurement was carried out in the same manner as in Comparative Example 1, except that N-butyl-N-methylethanolamine was used instead of 2-butylethanolamine.

The amount of carbon dioxide absorbed at 40° C. was 0.27 mol per mol of the amine compound in the absorbing solution. The rate of absorption of carbon dioxide was 0.0038 mol/mol/min.

The results of measurement of the amount of carbon dioxide absorbed at 40° C., the rate of absorption of carbon dioxide, the heat of reaction, and the amount of amine compound recovered in the diffusibility test for Examples 1 to 8 and Comparative Examples 1 and 2 are shown in Table 1.

TABLE 1

| | Amount of $CO_2$ absorbed (mol/mol) | Rate of absorption of $CO_2$ (mol/mol/min) | Heat of reaction (kJ/mol) | Diffusibility (mass %) |
|---|---|---|---|---|
| Example 1 | 0.56 | 0.0047 | 63 | Not more than 0.01 |
| Example 2 | 0.55 | 0.0046 | 64 | Not more than 0.01 |
| Example 3 | 0.54 | 0.0044 | 64 | Not more than 0.01 |
| Example 4 | 0.42 | 0.0040 | 66 | Not more than 0.01 |
| Example 5 | 0.41 | 0.0038 | 66 | Not more than 0.01 |
| Example 6 | 0.50 | 0.0040 | 65 | Not more than 0.01 |
| Example 7 | 0.48 | 0.0041 | 64 | Not more than 0.01 |
| Example 8 | 0.41 | 0.0044 | 66 | Not more than 0.01 |
| Comparative Example 1 | 0.35 | 0.0043 | 64 | 0.2 |
| Comparative Example 2 | 0.27 | 0.0039 | 67 | 0.2 |

As is apparent from Table 1, for the absorbing solutions of Examples 1 to 8 where the cycloamino acid salt was used, the amount of carbon dioxide absorbed was large, the heat of reaction in the absorption of carbon dioxide was low, and the capability of absorbing carbon dioxide was excellent. On the other hand, for the absorbing solutions of Comparative Examples where piperazine-containing amine compounds were used, the amount of carbon dioxide absorbed was small although the heat of reaction was low.

For the absorbing solutions of Examples 1 to 8 where the amino acid salt was used, little or no amine compound diffused from the absorbing solution was found in the diffusibility test. On the other hand, in Comparative Example 1 where piperazine was used, about 0.2% by mass of amine compound was recovered in the diffusibility test.

According to the acidic gas absorbing agent, the acidic gas removing method, and the acidic gas removing apparatus in at least one of the above embodiments, the amount of acidic gas such as carbon dioxide absorbed can be increased and, further, the diffusibility of the reaction accelerator can be lowered.

Several embodiments of the present invention have been described. However, it should be noted that these embodiments are mere examples and are not intended to limit the scope of the invention. These novel embodiments may be carried out in other various modes and may be subjected to various omission, replacement and alternation without departing from the subject matter of the invention. These embodiments and their modifications would fall within the scope and spirit of the invention and are intended to be within the invention and the scope of its equivalents as set forth in the appended claims.

DESCRIPITON OF REFERENCE CHARACTERS

1 . . . acidic gas removing apparatus, 2 . . . absorber, 3 . . . regenerator, 4 . . . gas supply port, 5 . . . acidic gas absorbing agent supply port, 6 . . . gas discharge port, 7 . . . heat exchanger, 8 . . . heater, 9 . . . pump, 10 . . . cooler for absorbing solution, 11 . . . reflux drum, 12 . . . reflux cooler, 13 . . . recovered acidic gas line, and 14 . . . reflux water pump

The invention claimed is:
1. An acidic gas absorbing agent comprising:
an amino acid salt represented by general formula (1) or (2):

(1)

(2)

wherein COOMe represents a carboxylate group; Me represents an alkali metal; and $R^1$ and $R^2$ each independently represent an alkylene chain having 1 to 4 carbon atoms and a carboxylate group and/or an alkyl group having 1 to 4 carbon atoms may be bonded to any of the carbon atoms in the alkylene chain, provided that the total number of carbon atoms in the alkylene chains indicated by $R^1$ and $R^2$ is 1 to 5; and an amine compound represented by general formula (3):

(3)

wherein $R^3$ represents a substituted or unsubstituted cycloalkyl group having 3 to 8 carbon atoms; $R^4$ represents a hydrogen atom or an alkyl group having 1 to 4 carbon atoms; and $R^5$ represents a hydroxyalkyl group.

2. The acidic gas absorbing agent according to claim 1, wherein, in the amino acid salt represented by general formula (1), $R^1$ represents an alkylene chain having 3 carbon atoms.

3. The acidic gas absorbing agent according to claim 1, wherein, in the amine compound represented by general formula (3), $R^3$ represents a cycloalkyl group having 5 or 6 carbon atoms.

4. The acidic gas absorbing agent according to claim 1, wherein, in the amine compound represented by general formula (3), $R^5$ represents a 2-hydroxyethyl group.

5. The acidic gas absorbing agent according to claim 1, wherein the content of the amino acid salt represented by general formula (1) or (2) and the content of the amine compound represented by general formula (3) are 0.1 to 20% by mass and 10 to 60% by mass, respectively.

6. A method for removing an acidic gas, the method comprising bringing a gas containing an acidic gas into contact with an acidic gas absorbing agent according to claim 1 to remove the acidic gas from the gas containing the acidic gas.

7. An acidic gas removing apparatus comprising:
   an absorber that brings a gas containing an acidic gas into contact with an acidic gas absorbing agent to absorb the acidic gas in the acidic gas absorbing agent, thereby removing the acidic gas from the gas containing the acidic gas; and
   a regenerator that desorbs the acidic gas from the acidic gas absorbing agent with the acidic gas absorbed therein to regenerate the acidic gas absorbing agent,
   the acidic gas absorbing agent regenerated in the regenerator being reutilized in the absorber, wherein
   an acidic gas absorbing agent according to claim 1 is used as the acidic gas absorbing agent.

* * * * *